United States Patent
Chao et al.

(10) Patent No.: US 10,745,503 B2
(45) Date of Patent: Aug. 18, 2020

(54) EPOXIDIZED POLYFARNESENE AND METHODS FOR PRODUCING THE SAME

(71) Applicant: FINA TECHNOLOGY, INC., Houston, TX (US)

(72) Inventors: Herbert Chao, Paoli, PA (US); Taejun Yoo, Downingtown, PA (US); Sabrina Nehache, Marignane (FR)

(73) Assignee: FINA TECHNOLOGY, INC., Houston, TX (US)

( * ) Notice: Subject to any disclaimer, the term of this patent is extended or adjusted under 35 U.S.C. 154(b) by 84 days.

(21) Appl. No.: 16/104,384

(22) Filed: Aug. 17, 2018

(65) Prior Publication Data

US 2019/0055336 A1 Feb. 21, 2019

Related U.S. Application Data

(60) Provisional application No. 62/547,457, filed on Aug. 18, 2017.

(51) Int. Cl.
| | | |
|---|---|---|
| *C08L 63/08* | (2006.01) | |
| *C08L 63/00* | (2006.01) | |
| *C08G 59/34* | (2006.01) | |
| *C08G 59/20* | (2006.01) | |
| *C08F 236/22* | (2006.01) | |
| *C08F 36/22* | (2006.01) | |
| *C08F 136/22* | (2006.01) | |
| *C08C 19/02* | (2006.01) | |
| *C08G 59/02* | (2006.01) | |
| *C08C 19/06* | (2006.01) | |

(52) U.S. Cl.
CPC ............ *C08F 236/22* (2013.01); *C08C 19/02* (2013.01); *C08C 19/06* (2013.01); *C08F 36/22* (2013.01); *C08F 136/22* (2013.01); *C08G 59/027* (2013.01); *C08L 63/08* (2013.01); *C08F 2810/00* (2013.01)

(58) Field of Classification Search
None
See application file for complete search history.

(56) References Cited

U.S. PATENT DOCUMENTS

| | | | |
|---|---|---|---|
| 3,577,398 A | 5/1971 | Pace et al. | |
| 3,970,608 A | 7/1976 | Furukawa et al. | |
| 5,688,598 A | 11/1997 | Keck et al. | |
| 5,726,216 A | 3/1998 | Janke et al. | |
| 5,910,394 A | 6/1999 | Shelnut | |
| 6,410,156 B1 | 6/2002 | Akkapeddi et al. | |
| 6,423,776 B1 | 7/2002 | Akkapeddi et al. | |
| 6,455,605 B1 | 9/2002 | Giorgini et al. | |
| 6,499,358 B1 | 12/2002 | Hogan et al. | |
| 6,645,341 B1 | 11/2003 | Gordon | |
| 8,334,025 B2 | 12/2012 | Fong et al. | |
| 8,628,718 B2 | 1/2014 | Li et al. | |
| 8,968,871 B2 | 3/2015 | Abad et al. | |
| 9,273,226 B2 | 3/2016 | Li et al. | |
| 2001/0006759 A1 | 7/2001 | Shipley, Jr. et al. | |
| 2003/0008150 A1 | 1/2003 | Berejka et al. | |
| 2004/0097651 A1 | 5/2004 | Musa | |
| 2004/0143037 A1 | 7/2004 | Chang et al. | |
| 2005/0170187 A1 | 8/2005 | Ghoshal | |
| 2011/0207378 A1 | 8/2011 | Defoort et al. | |
| 2011/0251348 A1 | 10/2011 | Kloppenburg et al. | |
| 2012/0165474 A1 | 6/2012 | McPhee et al. | |
| 2013/0052380 A1 | 2/2013 | Most et al. | |
| 2013/0177764 A1 | 7/2013 | Abad et al. | |
| 2014/0130977 A1 | 5/2014 | Jaycox et al. | |
| 2015/0057403 A1 | 2/2015 | Koda et al. | |
| 2016/0376386 A1 | 12/2016 | Yoo et al. | |
| 2017/0130092 A1 | 5/2017 | Lai et al. | |
| 2018/0072826 A1* | 3/2018 | Henning | .................. C08C 19/38 |
| 2019/0016847 A1* | 1/2019 | Henning | .............. C08G 18/698 |

FOREIGN PATENT DOCUMENTS

| | | | |
|---|---|---|---|
| DE | 102007038442 A1 | 2/2009 | |
| DE | 102012210185 A1 | 12/2013 | |
| EP | 0565858 A1 | 10/1993 | |
| EP | 0859282 A1 | 8/1998 | |

(Continued)

OTHER PUBLICATIONS

Machine translation of WO 2014/157624 A1 (no date).*
Erickson et al., "Kraton Liquid™ Polymer/Solid Polymer Hybrid UV Cure Adhesives with Stable Peel Strength," Presented at the Pressure Sensitive Tape Council's TECH XXV Seminar, May 2002 pp. 229-243.
Research Product Data Sheet, Shell Chemical Company, "Kraton Liquid™ Polymer Research Product EKP-206." Aug. 23, 1995, 2 pages.
International Search Report and Written Opinion of the International Searching Authority for International Application No. PCT/US2018/046929, dated Nov. 21, 2018, 11 pages.

(Continued)

*Primary Examiner* — Michael J Feely
(74) *Attorney, Agent, or Firm* — Albert Shung

(57) ABSTRACT

Aspects of the present invention relate to polymers, and particularly to farnesene polymers functionalized with one or more oxirane groups and, optionally, one or more hydroxyl groups. According to one aspect of the invention, provided is an epoxidized and optionally hydroxyl-functionalized polyfarnesene. The epoxidized farnesene polymer has at least one of a side chain or a main backbone functionalized with at least one oxirane group and, optionally, at least one terminal end functionalized with a hydroxyl group. In accordance with another aspect of the invention, a method is provided for preparing an epoxidized and optionally hydroxyl-functionalized polyfarnesene. The method includes epoxidizing a farnesene polymer, which may optionally contain one or more terminal hydroxyl groups, to functionalize at least one of a side chain or a main backbone of the farnesene polymer with an oxirane group.

17 Claims, No Drawings

(56) References Cited

FOREIGN PATENT DOCUMENTS

| | | |
|---|---|---|
| EP | 0933681 A1 | 8/1999 |
| EP | 1130070 A2 | 9/2001 |
| EP | 2865721 A1 | 4/2015 |
| FR | 2935388 A1 | 3/2010 |
| FR | 2963579 A1 | 2/2012 |
| JP | 1121402 A | 1/1999 |
| JP | 11133608 A | 5/1999 |
| JP | 2007145972 A | 6/2007 |
| JP | 2007283564 A | 11/2007 |
| JP | 2007283565 A | 11/2007 |
| JP | 2007283566 A | 11/2007 |
| JP | 2008037879 A | 2/2008 |
| JP | 2008045081 A | 2/2008 |
| JP | 2010234718 A | 10/2010 |
| JP | 2011000869 A | 1/2011 |
| JP | 2012087209 A1 | 5/2012 |
| JP | 2012171155 A | 9/2012 |
| WO | 9705172 A1 | 2/1997 |
| WO | 9833645 A1 | 8/1998 |
| WO | 9853008 A1 | 11/1998 |
| WO | 0114470 A1 | 3/2001 |
| WO | 02072350 A1 | 9/2002 |
| WO | 02072695 A1 | 9/2002 |
| WO | 03016030 A1 | 2/2003 |
| WO | 03063920 A1 | 8/2003 |
| WO | 2004028993 A1 | 4/2004 |
| WO | 2006085839 A1 | 8/2006 |
| WO | 2006134766 A1 | 12/2006 |
| WO | 2006134767 A1 | 12/2006 |
| WO | 2007048819 A1 | 5/2007 |
| WO | 2007117664 A2 | 10/2007 |
| WO | 2009021917 A1 | 2/2009 |
| WO | 2011031399 A1 | 3/2011 |
| WO | 2012016757 A1 | 2/2012 |
| WO | 2012016766 A1 | 2/2012 |
| WO | 2012112266 A1 | 8/2012 |
| WO | 2013033147 A1 | 3/2013 |
| WO | 2013092541 A1 | 6/2013 |
| WO | 2014074404 A2 | 5/2014 |
| WO | 2014157624 A1 | 10/2014 |
| WO | 2015059253 A1 | 4/2015 |
| WO | 2015157612 A1 | 10/2015 |
| WO | 2015157615 A1 | 10/2015 |
| WO | 2017062482 A1 | 4/2017 |
| WO | WO-2017065864 A2 * | 4/2017 ............ C09D 13/00 |
| WO | 2017134674 A1 | 8/2017 |

OTHER PUBLICATIONS

International Preliminary Report on Patentability and Written Opinion for International Application No. PCT/US2018/046929, dated Feb. 18, 2020, 8 pages.

* cited by examiner

EPOXIDIZED POLYFARNESENE AND METHODS FOR PRODUCING THE SAME

CROSS-REFERENCE TO RELATED APPLICATION

This application claims priority to U.S. Provisional Application No. 62/547,457, filed Aug. 18, 2017, the disclosure of which is incorporated herein by reference in its entirety for all purposes.

FIELD OF THE INVENTION

The present invention relates to farnesene polymers, and particularly to farnesene polymers functionalized with one or more oxirane groups and, optionally, one or more hydroxyl groups, as well as methods for producing and using the same.

BACKGROUND OF THE INVENTION

Farnesene monomers are one of numerous types of monomers that may be formed from renewable resources. For example, farnesene monomers may be prepared by chemical synthesis from petroleum resources, extracted from insects, such as Aphididae, and/or plants, such as apples. Farnesene monomers may also be prepared from culturing a microorganism (e.g., a yeast) using a carbon source derived from a saccharide. Therefore, polymers formed from farnesene monomers may be derived, at least in part, from a renewable resource. Accordingly, farnesene monomers are desirable from a sourcing perspective.

Functionalized farnesene polymers, that is, polymers of farnesene that contain one or more functional groups, especially functional groups capable of further reaction or modification, would also be desirable, as such polymers would be useful as components of formulated products such as adhesives, coatings, sealants, elastomers and the like.

SUMMARY OF THE INVENTION

Aspects of the present invention relate to polymers, and particularly to farnesene polymers functionalized with at least one oxirane group and, optionally, at least one hydroxyl group per polymer molecule.

According to one aspect of the invention, provided is an epoxidized polyfarnesene. The farnesene polymer has at least one of a side chain or a main backbone functionalized with an oxirane group and, optionally, at least one terminal end functionalized with a hydroxyl group.

In accordance with another aspect of the invention, a method is provided for preparing an epoxidized polyfarnesene, such as an epoxidized hydroxyl-functional polyfarnesene. The method includes epoxidizing a farnesene polymer, such as a hydroxyl-terminated farnesene polymer, to functionalize at least one of a side chain or a main backbone of the farnesene polymer with at least one oxirane group. The farnesene polymer may also have at least one terminal end functionalized with a hydroxyl group. Functionalization with hydroxyl groups preferably is carried out before epoxidation of the farnesene polymer.

DETAILED DESCRIPTION OF THE INVENTION

Aspects of the present invention relate to epoxidized farnesene homopolymers or copolymers of low viscosity. The invention also relates to crosslinkable epoxidized polymers made from such homopolymers and copolymers and adhesive compositions made therefrom.

The present inventors recognized that polyfarnesene-derived polyols have significantly lower viscosities as compared to the viscosities of hydroxyl-terminated polybutadienes of a similar molecular weight. This may be attributed to the long and tightly compacted side chains attached to the main backbone of polyfarnesene. The epoxidized functionalities may be located on a side chain or a main backbone of the farnesene polymer. The epoxidized hydroxyl-functional farnesene polymer may maintain a low viscosity. For example, the hydroxyl-functionalized polyfarnesene may have a viscosity at 25° C. of not more than 50% of the viscosity of a hydroxyl-terminated butadiene polymer of the same number average molecular weight and oxirane content. In one embodiment, the epoxidized hydroxyl-functionalized polyfarnesene has a viscosity at 25° C. of 50% or less than that of an epoxidized hydroxyl-functionalized polybutadiene of a similar molecular weight and oxirane content.

An epoxidized hydroxyl-functionalized farnesene polymer can be cured by itself, or after it is polymerized with polyisocyanates or other hydroxyl-reactive substances, through the epoxy (oxirane) functionalities. The epoxidized hydroxyl-functionalized farnesene polymers may, thus, be functional as dual cure polymers, with curing of the polymer being possible through reactions involving both the hydroxyl and epoxy functional groups. In addition, the epoxidized and optionally hydroxyl-functionalized polyfarnesene (including copolymers of farnesene with one or more other monomers) can be fully or partially hydrogenated to increase its thermal and weather stability. The hydrogenated epoxidized and optionally hydroxyl-functionalized polyfarnesene can be further cured for improved mechanical properties.

At least one of the polyfarnesenes used to prepare an epoxidized polyfarnesene in accordance with the present invention may be a farnesene-based polymer (which may be, for example, a monol or polyol) having a number average molecular weight less than or equal to 100,000 g/mol, desirably a number average molecular weight less than or equal to 25,000 g/mol, desirably a number average molecular weight less than or equal to 20,000 g/mol, desirably a number average molecular weight less than or equal to 15,000 g/mol, desirably a number average molecular weight less than or equal to 10,000 g/mol, or desirably a number average molecular weight less than or equal to 5,000 g/mol based on a polystyrene calibration curve. The epoxidized and optionally hydroxyl-functionalized polyfarnesene may have a viscosity, at 25° C., of 10,000 cP or less, 8,000 cP or less, 6,000 cP or less, 4,000 cP or less, or 3,000 cP or less. The farnesene-based polymer may contain no hydroxyl functionality and be a farnesene homopolymer or a copolymer of farnesene and, optionally, one or more dienes and/or vinyl aromatics or may be a monol or polyol of a farnesene homopolymer or a copolymer of farnesene and, optionally, one or more dienes and/or vinyl aromatics. Suitable examples of comonomers include, but are not limited to, butadiene, isoprene, and vinyl aromatics such as styrene. The hydroxyl-functionalized polyfarnesene may comprise one or more terminal hydroxyl groups per polymer chain. The hydroxyl groups preferably are primary hydroxyl groups. Methods of making hydroxyl-functionalized polyfarnesenes are known in the art and are described, for example, in the following publications: U.S. Patent Publication No. 2016/0376386, which is incorporated herein in its entirety. Suitable farnesene polymerization processes include anionic and radical polymerizations, such as those described in U.S. Patent Publication No. 2012/0165474, which is incorporated herein in its entirety.

Epoxidation may occur first at the unsaturations (doubled bonded carbons) with trisubstituents, which are the majority of unsaturations in farnesene polymers. Even though the farnesene polymer has a trisubstituted unsaturation group structure located at the main backbone that is similar to the trisubstituted unsaturation group structure located at the side chain, the epoxidation may occur, preferentially, at the side chain due to the main backbone being sterically hindered with the side chains. The epoxidized farnesene polymer may have an amount of 0.5% to 15%, by weight, of oxirane oxygen, as measured by titration. Preferably, the farnesene polymer has an oxirane oxygen content of 0.5% to 12%, preferably 0.5% to 10%, preferably 1% to 10%, preferably 1.5% to 7%, and/or preferably 2% to 5%, by weight, of oxirane oxygen. In one embodiment, 25% to 50% of the unsaturation groups present in the starting farnesene polymer are functionalized with an oxirane group. In another embodiment, about ⅓ of the unsaturation groups present in the starting farnesene polymer are functionalized with an oxirane group.

Epoxidation of the farnesene polymer can be effected by methods such as by reaction with organic peracids which can be preformed or formed in situ. Suitable preformed peracids include peracetic and perbenzoic acids. In situ formation may be accomplished by using hydrogen peroxide and a low molecular weight carboxylic acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization kettle (in the polymer solution in which the polymer was polymerized) or, alternatively, the polymer can be redissolved in an inert solvent such as toluene, benzene, hexane, cyclohexane, methylene chloride or the like, with epoxidation conducted in this new solution, or epoxidized neat. Epoxidation temperatures of about −20° C. to 150° C., preferably about 0° C. to 130° C., and reaction times from about 0.1 hour to 72 hours, preferably about 1 hour to 60 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in olefinic polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation. Epoxidation may also be accomplished by treatment of the polymer with hydroperoxide in the presence of a transition metal such as Mo, W, Cr, V or Ag. Epoxy functionality may also be created by direct oxidation of ethylenic unsaturation by 02 in the presence of tetracyanoethylene. A temperature of about 150° C. and an oxygen partial pressure of about 58 atmospheres is suitable for this reaction.

The epoxidized farnesene polymers are preferably cured by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used. The most common sources of alpha, beta, and gamma radiation are radioactive nuclei. An ionizing radiation source with commercial polymer crosslinking applications is gamma radiation that is produced from either cobalt-60 or cesium-137 radioactive nuclei. X-rays can be produced through deceleration of high speed electrons through the electric field of an atomic nucleus.

When using non-ionizing radiation it is important to employ a photoinitiator to initiate the crosslinking reaction. Useful photoinitiators include diaryliodonium, alkoxy-substituted diaryliodonium, triarylsulfonium, dialkylphenacrylsulfonium, and dialkyl-4-hydrophenyl sulfonium salts. The anions in these salts generally possess low nucleophilic character and include $SbF_6$, $BF_4$, $PF_6$, and $AsF_6$. Specific examples include (4-octyloxyphenyl)-phenyl-iodonium hexafluoroantimonate, UVI-6990 (from Dow), and FX-512 (3M Company). Bis(dodecylphenyl)iodonium hexafluoroantimonate, UVI-6974 (Dow), is especially effective.

The epoxidized farnesene polymers, and compositions comprising such epoxidized farnesene polymers, may be cured using photosensitizers in addition to photoinitiators. Examples of suitable photosensitizers include thioxanthone, anthracene, perylene, phenothiazine, 1,2-benzanthracene, coronene, pyrene and tetracene. The photoinitiator and photosensitizer are preferably compatible with the epoxidized farnesene polymer being cross linked and the light source available. Radiation-induced cationic curing may also be done in combination with free radical curing. Free radical curing can be further enhanced by the addition of additional free radical photoinitiators and photosensitizers for them. Reactive diluents, which may or may not be radiation curable, that can be combined with the epoxidized farnesene polymer include alcohols, vinyl ethers, epoxides, acrylate and methacrylate monomers, oligomers and polymers. The epoxidized farnesene polymer may also be blended with other diene-based polymers. Examples of suitable epoxides, which may contain one, two or more epoxy groups per molecule and which may be monomeric, oligomeric or polymeric, include bis(2,3-epoxy cyclopentyl)ether (Dow EP-205), vinyl cyclohexene dioxide, limonene dioxide, cyclohexene oxide, trimethylolpropane triglycidyl ether, epoxidized soy and linseed oils and epoxidized fatty acids. Examples of suitable other diene-based polymers include copolymers comprising, in polymerized form, at least one diene monomer (such as butadiene) and, optionally, at least one vinyl aromatic monomer (such as styrene). The diene-based polymer may be epoxidized (i.e., may be functionalized with one or more epoxy groups per molecule) and/or may contain one or more hydroxyl groups per molecule. According to a preferred embodiment, one or more epoxidized diene-based polymers (such as an epoxidized polybutadiene or epoxidized hydroxyl-terminated polybutadiene) are utilized in combination with one or more epoxidized farnesene polymers in accordance with the present invention.

Cationic photoinitiators, such as onium salts, can be used alone or in conjunction with a photosensitizer to respond to long wave length UV and visible light. Onium salts may be adapted to react to UV and/or visible light to form an acid (e.g., a Lewis acid) that cures or facilitates curing of the epoxidized farnesene polymers. Suitable onium salts include, but are not limited to triphenylsulfonium salts, diazonium salts, diaryliodonium salts and ferrocenium salts as well as various metallocene compounds. The use of cationic initiators in compositions containing epoxidized farnesene polymers may be particularly advantageous for use as sealants in the electronics industry.

The epoxidized farnesene polymers, and compositions comprising such epoxidized farnesene polymers, may also be cured without the use of radiation by addition of a cationic initiator which does not need to be activated by exposure to radiation. Suitable cationic initiators of this type include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic acid (triflic acid) and the salts of triflic acid such as FC-520, as produced by 3M Company. The cationic initiator is preferably compatible with the polymer being cross linked, the method of application and cure temperature. The epoxy-containing polymers may also be cross linked by the addition of multifunctional carboxylic acids and acid anhydrides and in general by the curing methods described in U.S. Pat. No. 3,970,608, which is incorporated in its entirety by reference. Radiation cross linking is preferred because reactive ingredients do not come in contact with warm adhesives.

The cross linked polymers of the present invention are useful in adhesives (including, but not limited to, pressure sensitive adhesives, contact adhesives, laminating adhesives and assembly adhesives), sealants, coatings, films (such as, e.g., those requiring heat and solvent resistance), etc. The polymers disclosed herein enable the production of improved adhesive compositions, which may greatly benefit industries such as the synthetic rubber industry, automotive industry, construction industry, electronics industry, packaging industry, etc. For example, the epoxidized farnesene polymers according to one aspect of the invention are useful for the bonding of structural objects. In accordance with another aspect of the invention, the farnesene polymers may be employed to produce improved sealants for use in, e.g., production of solar/photovoltaic panels, electronic circuitry, automobile parts, etc. In accordance with yet a third aspect, the farnesene polymers have improved bonding properties for bonding polymers to metals and/or bonding organic materials to metals.

In adhesive applications, it may be necessary to add an adhesion promoting or tackifying resin that is compatible with the polymer. A common tackifying resin is a diene-olefin copolymer of piperylene and 2-methyl-2 butene having a softening point of about 95° C. This resin is available commercially under the tradename WINGTACK® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398, which is incorporated herein by reference in its entirety. Other tackifying resins, such as PICCOTEX® 120 resin, may be employed wherein the resinous copolymer comprises 20-80%, by weight, of piperylene and 80-20%, by weight, of 2-methyl-2-butene. The resins normally have softening points (ring and ball) between about 80° C. and about 115° C.

Other adhesion promoting resins which are also useful in the compositions of this invention include hydrogenated resins, esters of rosins, polyterpenes, terpene phenol resins and polymerized mixed olefins, lower softening point resins and liquid resins. An example of a liquid resin is ADTAC® LV resin from Hercules. To obtain good thermo-oxidative and color stability, it is preferred that the tackifying resin be a saturated resin, e.g., a hydrogenated dicyclopentadiene resin such as ESCOREZ® 5000 series resin made by Exxon or a hydrogenated polystyrene or polyalphamethylstyrene resin such as REGALREZ® resin made by Hercules. The amount of adhesion promoting resin employed may vary from about 10 to about 400 parts by weight per hundred parts rubber (phr), preferably from about 20 to about 350 phr. The selection of the particular tackifying agent is, in large part, dependent upon the specific polymer employed in the respective adhesive composition. The adhesive composition of the instant invention may contain plasticizers, such as rubber extending plasticizers, or compounding oils or organic or inorganic pigments and dyes. Rubber compounding oils are well known in the art and include both high saturates content oils and high aromatics content oils. Preferred plasticizers are highly saturated oils, e.g. TUFFLO® 6056 and 6204 oil made by Citgo and process oils, e.g., SHELLFLEX® 371 oil made by Shell. The amounts of rubber compounding oil employed in the invention composition can vary from 0 to about 500 phr, preferably between about 0 to about 100 phr, and most preferably between about 0 and about 60 phr. Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

In order that the invention may be more fully understood, the following non-limiting examples are provided by way of illustration only.

Example 1—Epoxidation Processes

Three processes were used to epoxidize a farnesene diol polymer. In the first process, tungstic acid (0.37 g), phosphoric acid (0.37 g), toluene (200 mL), polyfarnesene diol, Mn=3,000 g/mol, (110 g) and ALIQUAT® 336 quaternary ammonium salt (1.07 g) were loaded into a separating flask and were heated with a heating mantle and stirred at 60° C. After the temperature reached 60° C., hydrogen peroxide (35% in water, 50 mL) was slowly added, using a dropping funnel, over 90 min.

After the addition of hydrogen peroxide was completed, the mixture was stirred for 4 hours at 60° C. After 4 hours of reaction time, 100 mL of water was poured into the flask and the reaction mixture was stirred for one minute. The mixture was then allowed to settle for 1 hour. The aqueous phase was separated from the organic phase. This operation was repeated to wash the organic phase until the pH of the washed water became neutral. The polymer solution was then dried over magnesium sulfate and the toluene was stripped by rotary evaporator under vacuum. The resulting polymer (slightly yellow and hazy) was analyzed by FT-IR and showed peaks at 1324-1250 $cm^{-1}$ and also at 732-686 $cm^{-1}$, characteristic of the oxirane groups. Also, the peak of the OH end group of the polyfarnesene diol slightly shifted from 3327 to 3479 $cm^{-1}$. The polymer was then titrated with perchloric add and cetyl trimethyl ammonium bromide. The epoxy value ("E.V.") was found to be 156.46 meq KOH per gram of sample, meaning that the oxirane content reached 4.4% in the polymer, that is to say 9 epoxy groups per polymer chain. The GPC showed that the base and the epoxidized polyfarnesene diol graphs overlaid perfectly, suggesting no epoxy ring opening occurred during the reaction.

The epoxy value (E.V.) was then determined by titration using perchloric acid. Table 1, shown below, includes properties of the polyfarnesene diol before and after the epoxidation processes.

TABLE 1

| | Viscosity (25° C.) (cP) | GPC Mn (g/mol) | E.V. (mg KOH/g) | Oxirane (%) |
|---|---|---|---|---|
| Polyfarnesene diol | 1,854 | 2,722 | 0 | 0 |
| Polyfarnesene diol (epoxidized) | 6,689 | 3,384 | 156.46 | 4.4 |

In the second epoxidation, polyfarnesene diol (55 g), peracetic acid (32 wt. % in acetic acid, 10 mL) and toluene (100 mL) were employed. Specifically, polyfarnesene diol and toluene were loaded into the flask and heated at 60° C., and then the peracetic acid was slowly added over 90 minutes. The mixture was stirred for 4 hours. The product was purified and isolated following the same procedure as in the first process. It was analyzed by FT-IR and titrated. The epoxidation was successful and was found to give a product having an E.V of 47.3 meq KOH per gram of sample and an oxirane percentage of 1.34%, that is to say around 3 epoxy groups per polymer chain. This result was in agreement with the theoretical value.

The third process employed metachloroperbenzoic acid ("mCPBA"). Polyfarnesene diol (15 g) and dichloromethane (90 mL) were loaded in a round bottom flask and placed into an ice bath and cooled down for 30 min. A solution of mCPBA (4.3 g) in chloroform (38 mL) was then added to the flask dropwise for 1 hour with the flask in the ice bath. The mixture was then stirred at room temperature for 3 hours. After 3 hours, the organic phase was washed with a solution of sulfite and sodium bicarbonate to remove the unreacted mCPBA. It was dried over magnesium sulfate and the solvent was evaporated. The FT-IR showed no peak at 1700 cm$^{-1}$, suggesting that there was no ring opening. The titration of the product gave an E.V value of 50.67 meq of KOH per gram of sample, corresponding to 1.44% of oxirane in the polymer, that is to say around 3 epoxy groups per polymer chain.

Polyfarnesene diol (15 g) and dichloromethane (90 mL) were loaded in a round bottom flask and placed into an ice bath to be cooled for 30 minutes. A solution of mCPBA (18.97 g) in chloroform (150 mL) was then added to the flask dropwise for 2 hours with the flask in the ice bath. The mixture was then stirred at room temperature for 3 hours. After the 3 hours of stirring, the organic phase was washed with a solution of sulfite and sodium bicarbonate to remove the unreacted mCPBA. It was dried over magnesium sulfate and the solvent was evaporated. The FT-IR showed no peak at 1700 cm-1, suggesting that there was no ring opening. The titration gave an E.V value of 166.01 meq of KOH per gram of sample, which was calculated to equal 4.73% of oxirane in the polymer or about 9 oxirane groups per chain of polymer. To try to increase the percentage of oxirane, the same process was repeated but with a reaction time of 24 hours. The epoxy value of this product was 167.29 meq of KOH per gram of sample, which was calculated to equal to 4.77% of oxirane in the polymer or about 9 oxirane groups per chain of the polymer. Furthermore, a peak of around 1700 cm-1 appeared on the FT-IR suggesting some ring openings were happening based on the reaction time being extended too much.

Example 2—Curing Processes for the Epoxidized Polyfarnesene Diols

Cross linking of the epoxidized polyfarnesene diol (4.4% oxirane) was carried out using boron trifluoride ethylamine complex (BF$_3$ complex).

Epoxidized polyfarnesene diol (2.0 g, 100 parts), containing 4.4% of oxirane, and boron trifluoride ethylamine complex (0.1 g, 5 parts) were placed in an aluminum pan and mixed together. To improve mixing and melting of the BF$_3$ complex, the pan containing the mixture was placed in an oven heated at a temperature of 100° C. While heated, the mixture was stirred every five minutes to ensure the complete melting of the BF$_3$ complex and to homogenize the sample. Once the mixture was homogeneous, it was cured at 150° C. for 1 hour. Once cured, the sample was removed from the pan and its hardness was measured using Shore A and Shore 00 equipment. The same procedure for curing was applied to RICON 657 (an epoxidized polybutadiene resin containing 6.5% of oxirane) to have a basis of comparison. Table 2, shown below, provides properties for the cured epoxidized polyfarnesene diol and the cured RICON® 657.

TABLE 2

| Sample ID | Oxirane content (%) | Curing temperature (° C.) | Curing time (h) | Hardness Shore 00 | Hardness Shore AA |
|---|---|---|---|---|---|
| Polyfarnesene diol (epoxidized) | 4.4 | 150 | 1 | 64 | 32 |
| RICON ® 657 | 6.5 | 150 | 1 | 70 | 55 |

Two samples were prepared for curing with BF$_3$ Amine complex and cyclohexene oxide. The properties of the two samples are provided below in Table 3.

TABLE 3

| Sample ID | Oxirane content (%) | mg | BF$_3$ complex (g) | Cyclohexene oxide (g) | Curing temp. (° C.) | Curing time (h) | Hardness Shore 00 | Hardness Shore AA |
|---|---|---|---|---|---|---|---|---|
| Polyfarnesene diol (epoxidized) | 4.4 | 1.3 | 0.1 | 0.7 | 150 | 3 | 65 | 40 |
| Polyfarnesene diol (epoxidized) | 4.4 | 1 | 0.1 | 1 | 150 | 3 | N/A | N/A |

Compared to the samples cured without cyclohexene oxide, these samples looked more homogeneous after curing. In fact, the cyclohexene oxide was used to solubilize first the $BF_3$ complex prior to the addition of the epoxidized polyfarnesene diol. Once the blends were homogeneous, the two samples were placed in the oven and heated gradually from 100 to 150° C. They were not cured at 150° C. directly because the boiling point of cyclohexene oxide was 130° C. The hardness of sample 2 could not be measured as this sample was too soft.

Two samples were prepared for curing with $BF_3$ Amine complex and trimethylolpropane triglycidyl ether, the properties of which are shown below in Table 4.

TABLE 4

| Sample ID | Oxirane content (%) | mg | $BF_3$ complex (g) | Trimethylolpropane triglycidyl ether (g) | Curing temp. (° C.) | Curing time (h) | Hardness Shore 00 | Hardness Shore AA |
|---|---|---|---|---|---|---|---|---|
| Polyfarnesene diol epoxidized | 4.4 | 1.3 | 0.3 | 0.7 | 150 | 2 | — | 52 |
| Polyfarnesene diol epoxidized | 4.4 | 1 | 0.3 | 1 | 150 | 2 | — | 88 |

The samples were prepared according to processes that are similar to those discussed above. However, the $BF_3$ complex was not soluble in the trimethylolpropane triglycidyl ether so the blends were not completely homogeneous. The bottoms were harder than the tops, which were sticky.

What is claimed is:

1. An epoxidized polyfarnesene comprising:
a farnesene polymer having at least a side chain or a main backbone functionalized with at least one oxirane group and wherein the farnesene polymer has at least one terminal end functionalized with a hydroxyl group.

2. The epoxidized polyfarnesene of claim 1, wherein the farnesene polymer comprises at least one tri-substituted oxirane group.

3. The epoxidized polyfarnesene of claim 2, wherein the tri-substituted oxirane group is bonded to the main backbone or the side chain of the farnesene polymer.

4. The epoxidized polyfarnesene of claim 1, wherein the farnesene polymer comprises a farnesene monomer and at least one comonomer in polymerized form.

5. The epoxidized polyfarnesene of claim 4, wherein the at least one comonomer comprises at least one comonomer selected from the group consisting of butadiene, isoprene, and vinyl aromatics.

6. The epoxidized polyfarnesene of claim 1, wherein the farnesene polymer has a number average molecular weight of 100,000 g/mol or less.

7. The epoxidized polyfarnesene of claim 6, wherein the farnesene polymer has a number average molecular weight of 25,000 g/mol or less.

8. The epoxidized polyfarnesene of claim 1, wherein the farnesene polymer has a viscosity at 25° C. of 10,000 cP or less.

9. The epoxidized polyfarnesene of claim 1, wherein the farnesene polymer has a viscosity at 25° C. of not more than 50% of that of a hydroxyl-terminated butadiene polymer of the same number average molecular weight and oxirane content.

10. The epoxidized polyfarnesene of claim 1, wherein the farnesene polymer has an amount of oxirane oxygen of from 0.5% to 10%, by weight.

11. A method for preparing a crosslinked composition, comprising curing a composition comprised of an epoxidized farnesene polymer in accordance with claim 1 to produce cross linking between individual epoxidized farnesene polymer molecules, wherein the epoxidized farnesene polymer molecules are at least one of a homopolymer or a copolymer.

12. A method for preparing an epoxide functionalized polyfarnesene comprising:
epoxidizing a farnesene polymer to functionalize at least one of a side chain or a main backbone of the farnesene polymer with at least one oxirane group and further comprising functionalizing at least one terminal end of the farnesene polymer with a hydroxyl group.

13. The method of claim 12, further comprising a step of hydrogenating the farnesene polymer.

14. The method of claim 13, wherein the step of hydrogenating the farnesene polymer is performed such that the oxirane group is not opened.

15. The method of claim 13, wherein the step of hydrogenating the farnesene polymer is performed before the epoxidation step.

16. A composition comprising:
at least one epoxide functionalized farnesene polymer having at least one side chain or main chain functionalized with an oxirane group and at least one terminal end functionalized with a hydroxyl group; and
at least one epoxide other than the epoxide functionalized farnesene polymer.

17. The composition of claim 16, wherein the at least one epoxide other than the epoxide functionalized farnesene polymer comprises at least one epoxidized diene-based copolymer, the epoxidized diene-based copolymer comprising, in polymerized form, at least one diene monomer and, optionally, at least one vinyl aromatic monomer.

* * * * *